(12) United States Patent
Passchyn et al.

(10) Patent No.: US 12,477,979 B2
(45) Date of Patent: Nov. 25, 2025

(54) MOVEABLE PANEL FOR BYPASSING CHOPPER OF AGRICULTURAL VEHICLE

(71) Applicant: CNH Industrial America LLC, New Holland, PA (US)

(72) Inventors: Tim Passchyn, Sint-Michiels (BE); Gilles Mommerency, Oostnieuwkerke (BE); Nathan Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 828 days.

(21) Appl. No.: 17/731,716

(22) Filed: Apr. 28, 2022

(65) Prior Publication Data
US 2022/0346313 A1    Nov. 3, 2022

Related U.S. Application Data

(60) Provisional application No. 63/180,847, filed on Apr. 28, 2021.

(51) Int. Cl.
*A01D 41/12*    (2006.01)
*A01F 12/40*    (2006.01)

(52) U.S. Cl.
CPC .......... *A01D 41/1243* (2013.01); *A01F 12/40* (2013.01)

(58) Field of Classification Search
CPC ............................ A01D 41/1243; A01F 12/40
See application file for complete search history.

(56) References Cited

U.S. PATENT DOCUMENTS 6,863,605 B2 * 3/2005 Gryspeerdt ........ A01D 41/1243
460/111
6,908,379 B2    6/2005 Gryspeerdt et al.
(Continued)

FOREIGN PATENT DOCUMENTS

DE    102007005173 A1    8/2008
EP         2111739 A1 * 10/2009 ......... A01D 41/1243
(Continued)

OTHER PUBLICATIONS

Extended European Search Report for EP Application No. 22170589.0 dated Sep. 26, 2022 (nine pages).

*Primary Examiner* — Joseph M Rocca
*Assistant Examiner* — Madeline I Runco
(74) *Attorney, Agent, or Firm* — Buchanan Ingersoll & Rooney PC (57) ABSTRACT

An agricultural harvester includes a chassis, and a residue handling system that receives a chaff flow and a residue flow into a flow passageway of the chassis. The residue handling system includes a chopper, a shroud at least partially surrounding the chopper, a spreader, and a moveable door panel assembly that is configured to be moved between a chopping mode position and a bypass mode position. The moveable door panel assembly includes a top door panel that is movably mounted to the top wall of the chassis, and a bottom door panel that is moveably mounted to the shroud. In the chopping mode position, the top and bottom door panels are positioned to permit the entrance of residue flow into the chopper. In the bypass mode position, the top and bottom door panels are positioned to either limit or substantially prevent the entrance of residue flow into the chopper.

16 Claims, 6 Drawing Sheets

(56) References Cited

U.S. PATENT DOCUMENTS

| | | | |
|---|---|---|---|
| 7,220,179 B2 | 5/2007 | Redekop et al. | |
| 7,648,413 B2 | 1/2010 | Duquesne et al. | |
| 8,992,294 B2 * | 3/2015 | Dilts | A01D 41/1243 |
| | | | 460/111 |
| 9,107,349 B2 | 8/2015 | Dilts et al. | |
| 9,137,944 B2 | 9/2015 | Dilts et al. | |
| 9,578,803 B2 | 2/2017 | Desmet et al. | |
| 10,575,471 B2 * | 3/2020 | Faulkner | A01F 7/06 |
| 2016/0135377 A1 * | 5/2016 | Ballegeer | A01F 12/40 |
| | | | 460/112 |

FOREIGN PATENT DOCUMENTS

| | | | |
|---|---|---|---|
| EP | 3172959 A1 | 5/2017 | |
| EP | 3172959 B1 | 9/2018 | |

* cited by examiner

MOVEABLE PANEL FOR BYPASSING CHOPPER OF AGRICULTURAL VEHICLE

FIELD OF THE INVENTION

The present invention relates to agricultural harvesters. More specifically, the present invention relates to a moveable panel or door for selectively bypassing a chopper of an agricultural harvester.

BACKGROUND OF THE INVENTION

As is described in U.S. Pat. No. 10,306,834 to CNH America LLC (the '834 Patent), which is incorporated by reference in its entirety and for all purposes, an agricultural harvester known as a "combine" is historically termed such because it combines multiple harvesting functions with a single harvesting unit, such as picking, threshing, separating and cleaning. The separating system of the combine directs the non-grain material to a residue system. The residue system distributes the non-grain material through a chopper, a spreader, and/or a windrow chute before it is distributed onto the field. It would be desirable to selectively and reliably control the distribution of the non-grain material through the chopper, the spreader, and the windrow chute using a system of movable panels or doors.

SUMMARY OF THE INVENTION

According to one aspect of the invention, an agricultural harvester comprises:
 a chassis defining a chaff and residue flow passageway that is at least partially delimited by a top wall and a bottom wall; and
 a residue handling system at least partially carried by said chassis for receiving a chaff flow and a residue flow into the flow passageway from a separating system of the harvester, said residue handling system including a chopper, a shroud at least partially surrounding the chopper, a spreader, and a moveable door panel assembly that is configured to be moved between a chopping mode position and a bypass mode position, wherein the moveable door panel assembly comprises at least one top door panel that is movably mounted to the top wall, and a bottom door panel that is moveably mounted to the shroud,
 wherein, in the chopping mode position, the top and bottom door panels of the moveable door assembly are positioned to permit the entrance of residue flow into the chopper, and, in the bypass mode position, the top and bottom door panels of the moveable door assembly are positioned to (i) either limit or substantially prevent the entrance of residue flow into the chopper and (ii) direct the residue flow directly into the spreader.

According to another aspect of the invention, in an agricultural vehicle including (i) a chassis defining a chaff and residue flow passageway that is at least partially delimited by a top wall and a bottom wall, and (ii) a residue handling system at least partially carried by said chassis for receiving a chaff flow and a residue flow from a separating system of the harvester, said residue handling system including a chopper, a shroud at least partially surrounding the chopper, a spreader, and a moveable door panel assembly comprising at least one top door panel that is movably mounted to the top wall, and a bottom door panel that is moveably mounted to the shroud, a method of operating the residue handling system comprises:
 moving the top and bottom door panels of the moveable door assembly to a chopping position whereupon the top and bottom door panels permit the entrance of residue flow into the chopper, and,
 moving the top and bottom door panels of the moveable door assembly to a bypass position whereupon the top and bottom door panels of the moveable door assembly are positioned to (i) either limit or substantially prevent the entrance of residue flow into the chopper and (ii) direct the residue flow directly into the spreader.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "straw" and "tailings" are used principally throughout this specification for convenience but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material is referred to as "tailings".

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIGS. 3-5.

Figure 1:
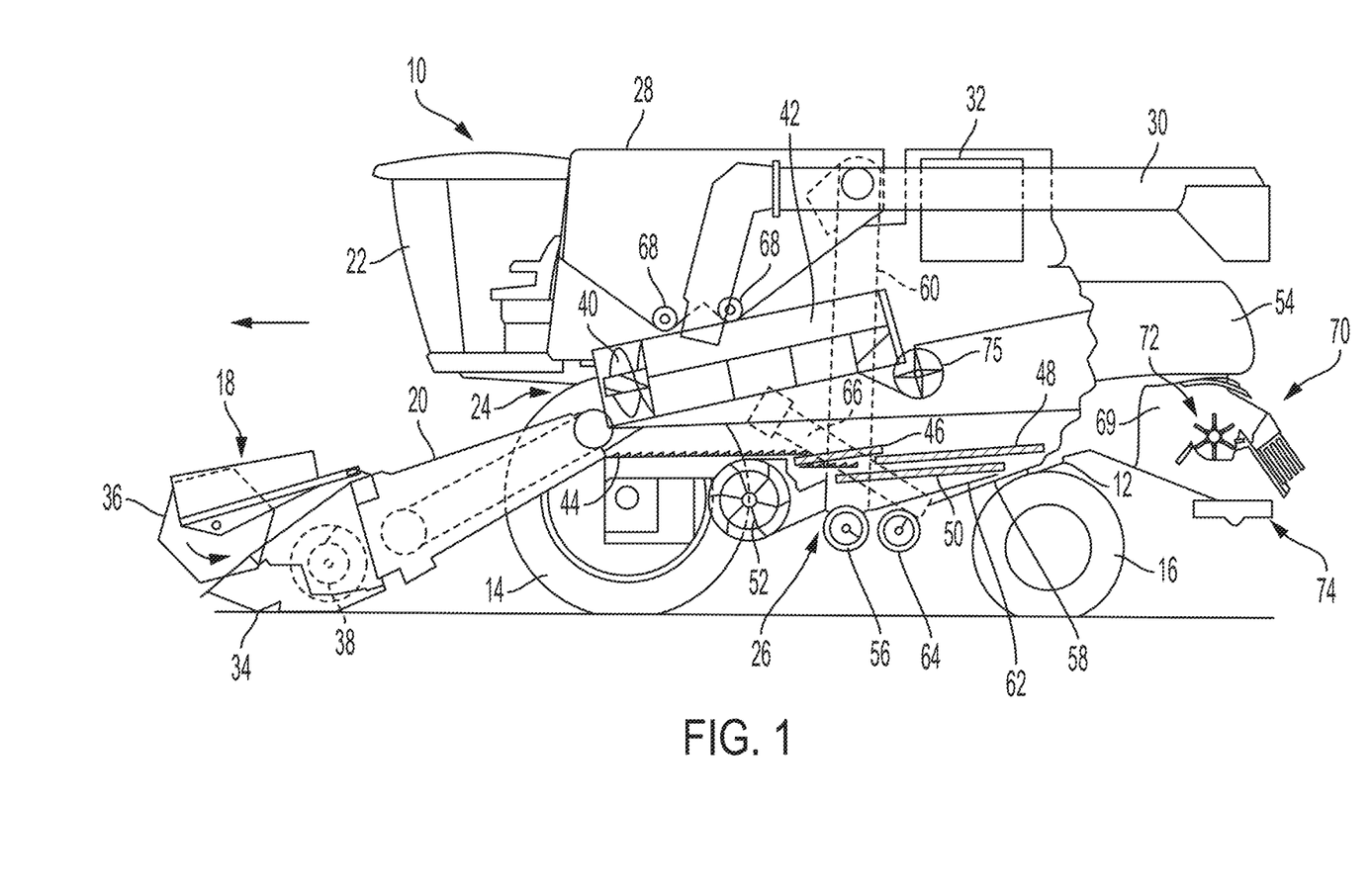
FIG. 1 is a side view of an embodiment of an agricultural harvester in the form of a combine illustrating the residue handling system of the present invention in a cutout view toward the rear of the harvester.
Figure 2:
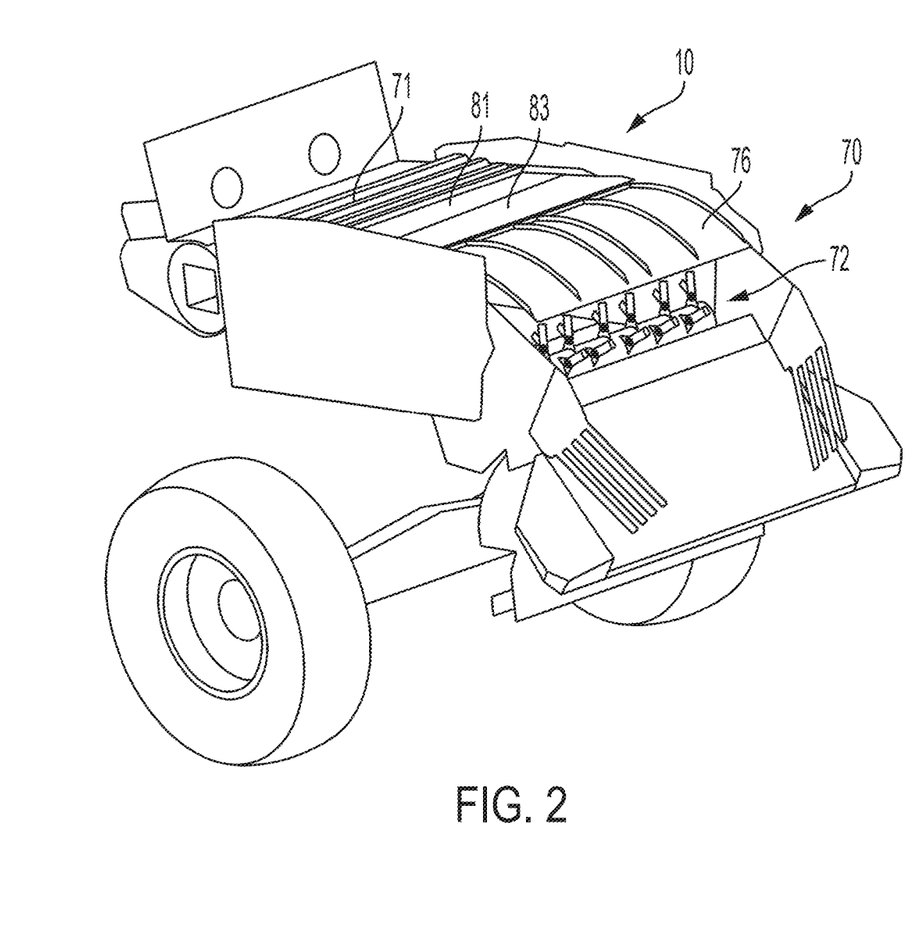
FIG. 2 is a rear perspective view of some of the components of the harvester of FIG. 1 showing further details of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Motive force is selectively applied to the front wheels 14 through a power plant in the form of a diesel engine 32 and a transmission (not shown).

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24.

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

Now, additionally referring to FIGS. 2-5, according to an aspect of the present invention, a residue handling system 70 is integrated in the rear of harvester 10. Residue handling system 70 generally comprises a flow passageway 69, a chopper 72, a horizontally oriented spreader 74, a windrow mode selection door 76, and a multi-component door assembly 77. The crop flow path 69 is defined between top and bottom walls 71 and 67 forming part of the chassis 12.

More specifically, chopper 72 is mounted to straw hood 54 at a location downstream of discharge beater 75, and above spreader 74. The spreader 74 receives two streams of crop residue when in a chopping mode and a bypass mode, namely, one residue stream 80 of straw (for example) from the discharge beater 75 and a second stream 78 of chaff from the cleaning system 26, depending upon the mode selected by an operator. The spreader 74 discharges the non-grain crop material across the harvested width behind harvester 10. Rotational axes of chopper 72 and spreader 74 are (optionally) orthogonal with respect to each other. Further details of chopper 72 and spreader 74 are provided in the '834 Patent.

Figure 3:
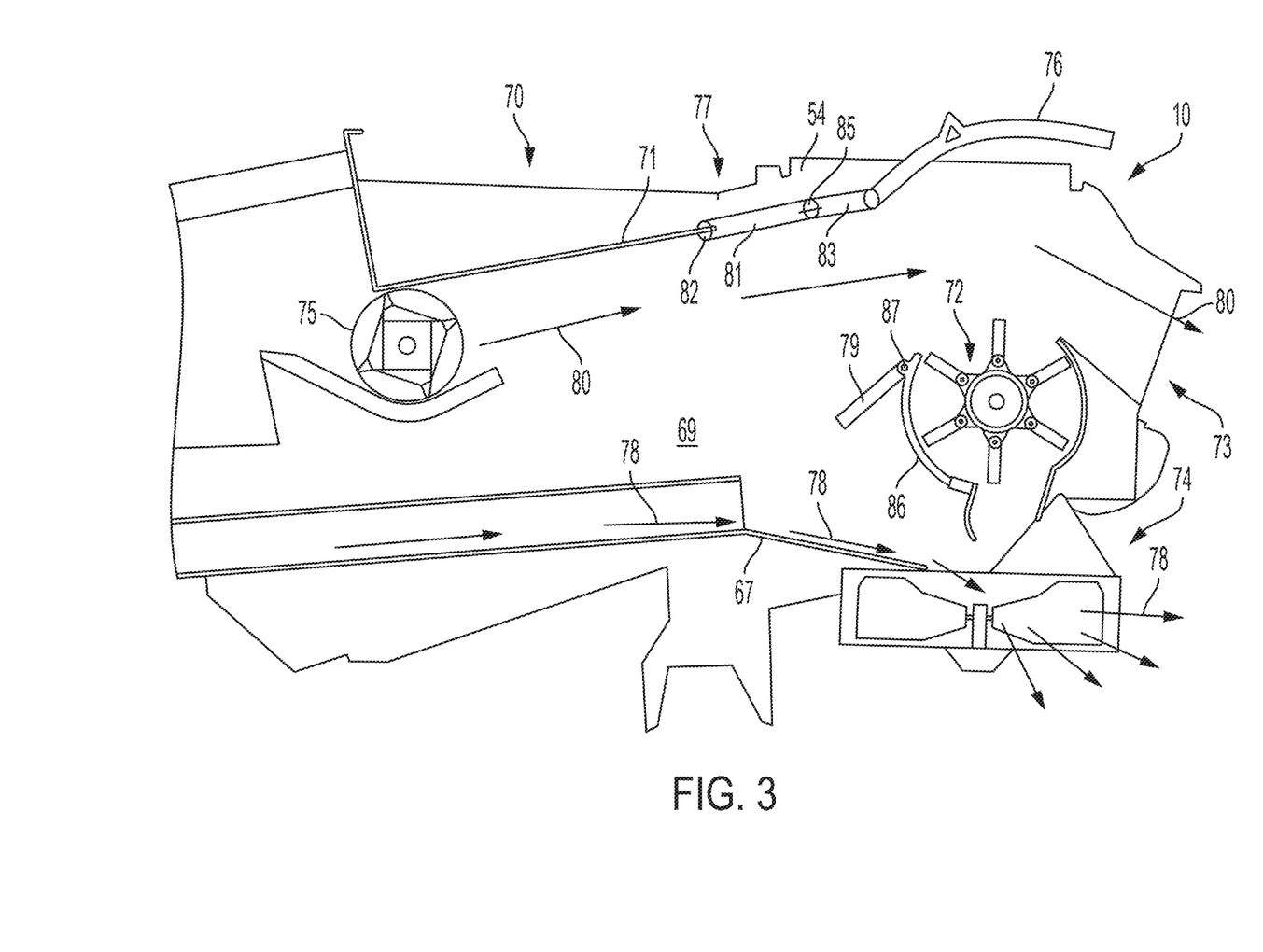
FIG. 3 is a side cutaway view of the residue handling system of FIGS. 1 and 2 in a windrow mode.
Figure 4:
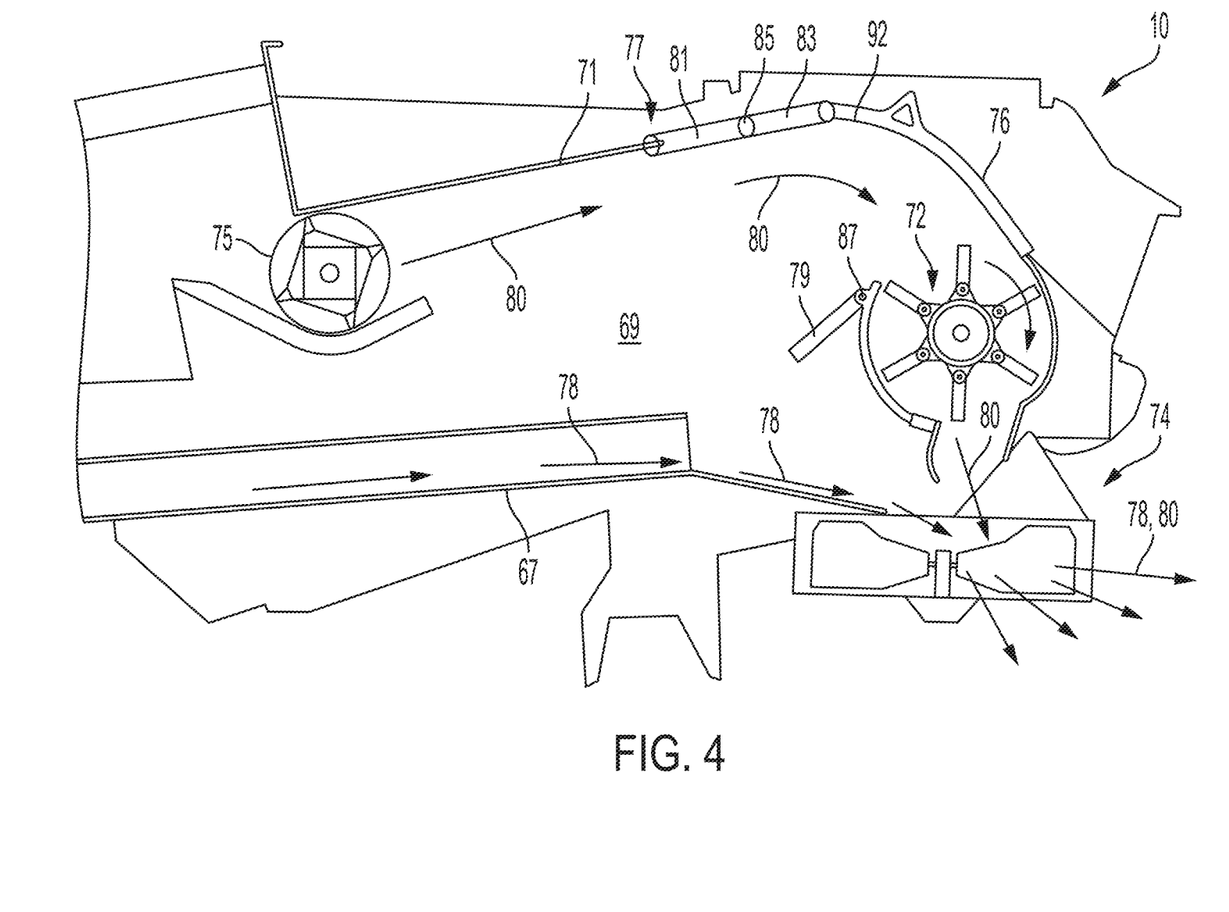
FIG. 4 is a side cutaway view of the residue handling system of FIGS. 1-3 in a chopping mode.
Figure 5:
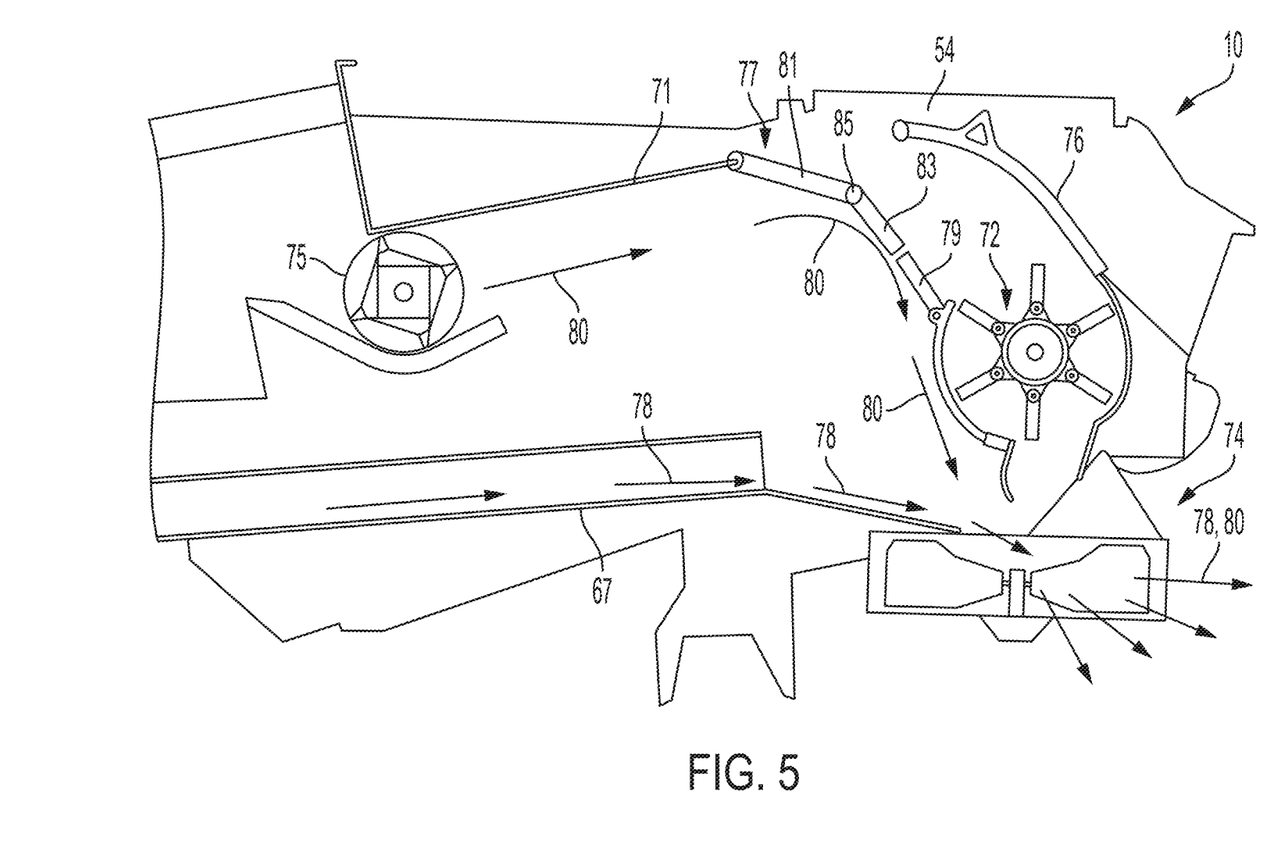
FIG. 5 is a side cutaway view of the residue handling system of FIGS. 1-3 in a bypass mode.

A windrow mode selection door 76 is mounted to the top wall 71 at a location above the residue chopper 72 and pivots between two positions, a deployed (i.e., extended) position shown in FIG. 3 and a retracted position shown in FIGS. 4 and 5. In the deployed position shown in FIG. 3, the first stream 80 of residue (straw), which is discharged from the discharge beater 75, is diverted over top of the residue chopper 72, through the windrow outlet 73 of the machine 10 and onto a hood or chute (see FIG. 1) that guides the residue to form a windrow behind the machine 10. This arrangement is referred to as windrow mode.

In the retracted position of door 76 shown in FIGS. 4 and 5, the door 76 prevents the first stream 80 of residue from passing through the outlet 73. And, the first stream 80 is directed to either the residue chopper 72 (chopping mode shown in FIG. 4) or the spreader 74 (bypass mode shown in FIG. 5), depending upon the mode selected by the operator.

The windrow door 76 may be pivoted by a mechanical linkage including a handle, a fluid power (hydraulic) system, or an electric actuator. The pivotal movement may be accomplished by the operator from either the cab 22, a remote location on the machine 10, or within proximity of the door 76 by way of a linkage including the handle.

Turning now to FIGS. 3-6, a multi-component door assembly 77 is mounted to straw hood 54 at a location downstream in the residue flow 80, and, upstream of windrow door 76. Door assembly 77 comprises three door panels 79, 81 and 83. Door panel 79 is generally detached from the other two panels 81 and 83, as will be described herein. Door panel 79 is pivotably mounted to the top upstream end (i.e., closest to beater 75) of chopper shroud 86. Shroud 86 partially encircles and encloses the chopper 72 and at least partially forms an inlet for the chopper 72. Shroud 86 may also be referred to in the art as a wrapper wall.

Figure 6:
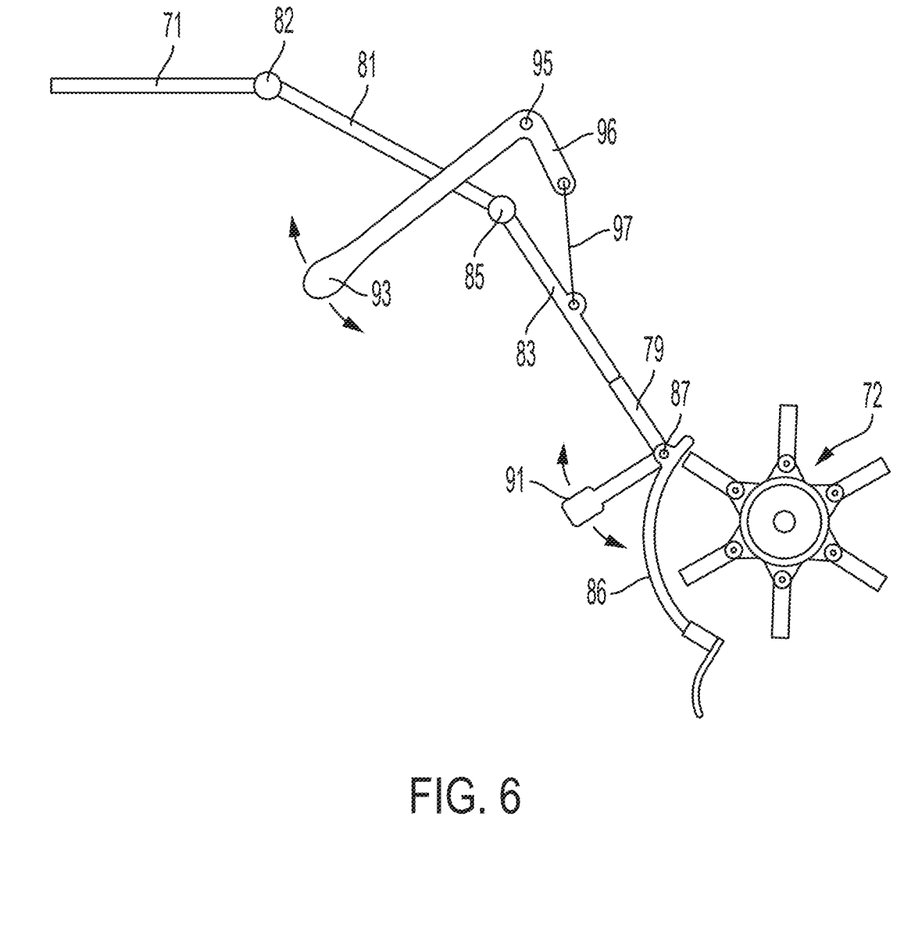
FIG. 6 is a linkage for moving the door assembly of the residue handling system of FIGS. 3-5.

As shown in FIG. 6, a handle 91 is connected to the panel 79 at the pivot joint 87 on the shroud 86 for manually moving the panel 79 between deployed and retracted positions, as will be described later. Door panel 79 may be pivoted by a mechanical linkage including the handle 91 (as shown), a fluid power (hydraulic) system, or an electric actuator. The pivotal movement may be accomplished by the operator using the handle 91 or remotely from either the cab 22 or another location on the machine 10. Physical stops project from the straw hood 54 for delimiting the motion of the panel 79 between the deployed and retracted positions.

As best shown in FIG. 6, door panels 81 and 83 are directly connected together, and can articulate with respect to each other. More particularly, panel 81 is pivotably connected to the top wall 71, and is configured to pivot about a fixed pivot joint 82. Panel 83 is connected to panel 81 by a pivot joint 85. Unlike pivot joint 82, pivot joint 85 is not fixed and can move in space. Door panels 81 and 83 are connected to, and constitute part of, the top wall 71 of the straw hood 54.

Door panels 81 and 83 articulate together between deployed and retracted positions using a handle 93. The handle 93 is configured to pivot about a fixed pivot axis 95 (i.e., axis 95 is stationary). A link or cable 97 interconnects an angled portion 96 of handle 93 and panel 83. Rotation of handle 93 causes panels 81 and 83 to move between the deployed and retracted positions. It should be understood that the free edge of panel 83 is positionable against the free edge of door 76 in the retracted position of panel 83 shown in FIG. 4, but does not move with door 76. Door panel panels 81 and 83 may be pivoted by a mechanical linkage including the handle 93 (as shown), a fluid power (hydraulic) system, or an electric actuator. The pivotal movement may be accomplished by the operator using the handle 93 or remotely from either the cab 22 or another location on the machine 10. A gas strut (not shown) may be connected to the handle 93 to aid in moving the heavy door panels 81 and 83 between the deployed and retracted positions. Physical stops project from the straw hood 54 for delimiting the motion of the panels 81 and 83 between the deployed and retracted positions.

Although not shown, door panels 81 and 83 may also be interconnected by a magnet in which the door panel 83 automatically moves to the deployed position under its own weight upon moving door panel 81 to the deployed position.

Door panels 81 and 83 are, preferably, flat plates, so that they form a flat surface on the top wall 71 when the plates are retracted position. Yet, in the deployed position of the panels 81 and 83 shown in FIG. 5, the panels 81 and 83 together form an angled or curved surface extending toward the shroud 86 for directing the stream 80 toward the spreader 74.

Door assembly 77 is configured to move between two positions, a deployed (i.e., extended) position shown in FIGS. 5 and 6 and a retracted position shown in FIGS. 3 and 4. In the deployed position shown in FIGS. 5 and 6, the door panels 81, 83 and 79 are positioned in contact with each other to form a wall upstream of the chopper 72 so that the first stream 80 bypasses the chopper 72 (referred to as the bypass mode) and is delivered directly to the spreader 74. In the retracted position shown in FIGS. 3 and 4, the door panels 81 and 83 are raised and door panel 79 is rotated downward thereby defining a passage for the first stream 80 to migrate to the chopper 72 (as shown in FIG. 4) and/or the outlet 73 (so long as the windrow door 76 is pivoted to the deployed position shown in FIG. 3).

In the windrow mode shown in FIG. 3, the first stream 80 of residue (e.g., straw) is directed to the outlet 73. Although not prevented from entering the chopper 72, the first stream 80 migrates directly to the outlet 73. The spreader 74 receives a second stream 78 of crop residue in the form of chaff from the cleaning shoe in a chaff flow 78.

In the chopping mode shown in FIG. 4, the first stream 80 of residue is directed to the chopper 72 since the windrow door 76 is rotated to the retracted position. The chopped first stream 80 is then directed to the spreader 74. The spreader 74 also receives the second stream 78 of crop residue in the form of chaff from the cleaning shoe in a chaff flow 78.

In the bypass mode shown in FIG. 5, both streams 78 and 80 are directed (directly) to the spreader 74 due to the position of the doors 76 and 77.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
a chassis defining a chaff and residue flow passageway that is at least partially delimited by a top wall and a bottom wall;
a discharge beater that (i) receives a residue flow from a threshing and separating system of the agricultural harvester and (ii) directs the residue flow in a downstream direction towards a chopper, wherein the top wall is positioned at least partially above the discharge beater in order to retain the directed residue flow within the chaff and residue flow passageway;
a residue handling system at least partially carried by said chassis for receiving a chaff flow and the residue flow into the flow passageway from the threshing and separating system of the harvester, said residue handling system including the chopper, a shroud at least partially surrounding the chopper, a spreader, and a moveable door panel assembly that is configured to be moved between a chopping mode position and a bypass mode position, wherein the moveable door panel assembly comprises at least one top door panel that is pivotably connected to and forms part of the top wall, and a bottom door panel that is moveably mounted to the shroud,
wherein, in the chopping mode position, (i) the top and bottom door panels of the moveable door assembly are positioned to permit the entrance of residue flow into the chopper, and (ii) the top door panel is maintained in a raised position with respect to a remainder of the top wall, and,
wherein, in the bypass mode position, (a) the top and bottom door panels of the moveable door assembly are positioned to (i) either limit or substantially prevent the entrance of residue flow into the chopper and (ii) direct the residue flow directly into the spreader, and (b) the top door panel is maintained in a lowered position with respect to the remainder of the top wall; and
a windrow door that is mounted either directly or indirectly to the top wall of the chassis and forms part of the top wall, wherein the windrow door is positioned downstream in the flow passageway relative to the top door panel, wherein the windrow door is configured to be moved between a retracted position and an extended position, wherein in the retracted position, the windrow door is configured to conceal a windrow outlet of the flow passageway, and in the extended position corresponding to a windrow mode, the windrow door is configured to reveal the windrow outlet of the flow passageway such that the residue can be distributed through the windrow outlet.

2. The agricultural harvester of claim 1, wherein the at least one top door panel comprises two top door panels, wherein one of the two top door panels is pivotably connected to the top wall about a fixed pivot axis, and the other of the two top door panels is pivotably connected to said one of the two top door panels about a moveable pivot axis.

3. The agricultural harvester of claim 2, further comprising a handle for moving the two top door panels between the chopping mode position and the bypass mode position, wherein the handle is configured to rotate about a fixed axis, and is connected to said other of the two top door panels by a link.

4. The agricultural harvester of claim 2, wherein, in the bypass mode position, the bottom door panel is positioned to contact said other of the two top door panels, and wherein, in the chopping mode position, the bottom door panel is not positioned to contact said other of the two top door panels.

5. The agricultural harvester of claim 1, further comprising a handle for moving the bottom door panel between the chopping mode position and the bypass mode position, wherein the handle is configured to rotate about a fixed axis.

6. The agricultural harvester of claim 1, wherein, in the bypass mode position, the bottom door panel is positioned to contact the top door panel, and wherein, in the chopping mode position, the bottom door panel is not positioned to contact the top door panel.

7. The agricultural harvester of claim 1, wherein the windrow door is configured to be moved to the retracted position when the top door panel is moved to the chopping mode position.

8. The agricultural harvester of claim 1, wherein the shroud partially encircles one side of the chopper.

9. The agricultural harvester of claim 1, wherein the door panels of the moveable door panel assembly are either flat or curved sheets.

10. The agricultural harvester of claim 1, wherein the spreader is positioned at an elevation beneath the chopper.

11. The agricultural harvester of claim 1, wherein, in the chopping mode position, the top door panel is maintained substantially flush with the remainder of the top wall, and, wherein, in the bypass mode position the top door panel is not maintained substantially flush with the remainder of the top wall.

12. The agricultural harvester of claim 1, wherein, in the chopping mode position, the top door panel is contiguous with the windrow door.

13. In an agricultural vehicle including (a) a chassis defining a chaff and residue flow passageway that is at least partially delimited by a top wall and a bottom wall, (b) a discharge beater that (i) receives a residue flow from a threshing and separating system of the agricultural harvester and (ii) directs the residue flow in a downstream direction towards a chopper, wherein the top wall is positioned at least partially above the discharge beater in order to retain the directed residue flow within the chaff and residue flow passageway, and (c) a residue handling system at least partially carried by said chassis for receiving a chaff flow and the residue flow from the threshing and separating system of the harvester, said residue handling system including the chopper, a shroud at least partially surrounding the chopper, a spreader, a moveable door panel assembly comprising (i) at least one top door panel that is pivotably connected to and forms part of the top wall and (ii) a bottom door panel that is moveably mounted to the shroud, and a windrow door that is mounted either directly or indirectly to the top wall of the chassis and forms part of the top wall, wherein the windrow door is positioned downstream in the flow passageway relative to the top door panel, wherein the windrow door is configured to be moved between a retracted position and an extended position, wherein in the retracted position, the windrow door is configured to conceal a windrow outlet of the flow passageway, and in the extended position corresponding to a windrow mode, the windrow door is configured to reveal the windrow outlet of the flow passageway such that the residue can be distributed through the windrow outlet, a method of operating the residue handling system comprises:

moving the top and bottom door panels of the moveable door assembly to a chopping mode position whereupon (i) the top and bottom door panels permit the entrance of residue flow into the chopper and (ii) the top door panel is maintained in a raised position with respect to a remainder of the top wall, moving the windrow door to the extended position corresponding to the windrow mode for windrowing, moving the windrow door to the retracted position; and moving the top and bottom door panels of the moveable door assembly to a bypass mode position whereupon (a) the top and bottom door panels of the moveable door assembly are positioned to (i) either limit or substantially prevent the entrance of residue flow into the chopper and (ii) direct the residue flow directly into the spreader, and (b) the top door panel is maintained in a lowered position with respect to the remainder of the top wall.

14. The method of claim 13, wherein in the bypass position, the top and bottom door panels are positioned in contact, and, in the chopping position, the top and bottom door panels are separated.

15. The method of claim 13, wherein the at least one top door panel comprises two top door panels, wherein one of the two top door panels is pivotably connected to the top wall about a fixed pivot axis, and the other of the two top door panels is pivotably connected to said one of the two top door panels about a moveable pivot axis.

16. The method of claim 13, wherein, in the chopping mode position, the top door panel is maintained substantially flush with the remainder of the top wall, and, wherein, in the bypass mode position the top door panel is not maintained substantially flush with the remainder of the top wall.

* * * * *